United States Patent

Pizzorno

[11] Patent Number: 5,165,939
[45] Date of Patent: Nov. 24, 1992

[54] VULCANIZATION PRESS HAVING TWO MOLDS OPERATED SEPARATELY FROM EACH OTHER, IN PARTICULAR FOR VEHICLE TIRES

[75] Inventor: Augusto Pizzorno, Milan, Italy

[73] Assignee: Pirelli Coordinamento Pneumatici S.p.A., Milan, Italy

[21] Appl. No.: 705,939

[22] Filed: May 29, 1991

[30] Foreign Application Priority Data

May 29, 1990 [IT] Italy ................ 20453 A/90

[51] Int. Cl.$^5$ .............. B29C 35/02; B29C 43/02; B29C 43/04
[52] U.S. Cl. ..................... 425/34.1; 425/38; 425/47; 425/195
[58] Field of Search .......... 425/33, 35, 38, 47, 425/185, 28.1, 34.1, 126.1, 450.1, 451.9, 451, 453, 454, 500, 195; 100/918

[56] References Cited

U.S. PATENT DOCUMENTS

| | | | |
|---|---|---|---|
| 3,097,394 | 7/1963 | Mallory et al. | 425/38 |
| 3,229,329 | 1/1966 | Heston et al. | 425/38 |
| 3,378,882 | 4/1968 | Turk et al. | 425/38 |
| 3,380,115 | 4/1968 | Soderquist | 425/38 |
| 3,541,643 | 11/1970 | Soderquist | 425/34.1 |
| 3,918,861 | 11/1975 | Close | 425/47 |
| 3,922,122 | 11/1975 | Bottasso et al. | 425/46 |
| 3,932,079 | 1/1976 | Legostaev et al. | 425/34.1 |
| 3,952,892 | 4/1976 | Robinson et al. | 214/340 |
| 3,976,409 | 8/1976 | Athey | 425/33 |
| 3,988,077 | 10/1976 | Naratov et al. | 425/33 |
| 3,989,428 | 11/1976 | Cox | 425/18 |
| 3,990,823 | 11/1976 | Moullac | 425/38 |
| 4,332,536 | 6/1982 | Singh et al. | 425/33 |
| 4,437,915 | 3/1984 | Appleby et al. | 152/176 |
| 4,447,385 | 5/1984 | Blosser et al. | 425/38 |
| 4,834,636 | 5/1989 | Ichikawa et al. | 425/38 |
| 4,871,305 | 10/1989 | Galigani | 425/38 |
| 4,936,365 | 6/1990 | Chrobak et al. | 152/452 |
| 4,964,792 | 10/1990 | Katayama et al. | 425/32 |

Primary Examiner—Willard E. Hoag
Attorney, Agent, or Firm—Stevens, Davis, Miller & Mosher

[57] ABSTRACT

A vulcanization press for vehicle tires having a bed with at least two molds, each mold having a lower holding mold on the bed and an upper counter-mold. A guide column upstanding from the bed has a handling arm projecting outwardly therefrom which is capable of vertical movement along the column and rotational movement about the column. The handling arm has a series of rotatably operable latches for engaging the upper counter mold cover of one mold and to move it upwardly and arcuately sideways and vertically downwardly to be positioned upon the other mold.

10 Claims, 3 Drawing Sheets

VULCANIZATION PRESS HAVING TWO MOLDS OPERATED SEPARATELY FROM EACH OTHER, IN PARTICULAR FOR VEHICLE TIRES

FIELD OF THE INVENTION

The present invention relates to a vulcanization press, in particular for vehicle tires, of the type comprising a bed, one mold consisting of a lower holding mold or holder and an upper counter-mold, the lower holder being operatively housed in the bed, a guide column disposed alongside the mold and standing up from the bed level, a handling arm mounted in cantilevered fashion on the guide column and designed to move vertically along the column and rotate about the axis thereof. One cover is secured under the handling arm, said upper counter-mold is securable under said cover, said cover being movable, upon the displacement of said arm, from an opening condition in which the upper counter-mold is raised from its lower holder to a closing condition in which the upper counter-mold is operatively coupled to the lower holder. The subject press is particularly of interest for carrying out the vulcanization of motor-vehicle tires and therefore the present description will be made with reference to this type of use. However the innovative solutions proposed by the invention can be used also on presses adapted for the vulcanization of any other rubber article.

BACKGROUND OF THE INVENTION

It is known that for carrying out the vulcanization of tires, presses are used generally comprising a bed housing the lower portion (holder) of one or more (generally two) vulcanization molds, in which the tire to be vulcanized is introduced. After the correct positioning of the tire has taken place, a movable crosspiece kinematically connected to the bed by a connecting rod-crank assembly is lowered onto the bed; fastened under said crosspiece is a number of upper counter-molds corresponding to that of the lower holders and designed to be paired therewith thereby forcing each tire to take a given conformation in the progress of the vulcanization process. In greater detail, within the tire enclosed between the lower holder and upper counter-mold is a chamber or bladder made of elastomeric material inflatable with steam under pressure, which bladder urges the tire against the mold walls. At the same time the steam contained in the bladder together with that circulating through the different parts of the mold and close thereto transmits the necessary heat for carrying out vulcanization of the tire.

When the above process is over, the crosspiece or beam and the upper counter-mold or counter-molds together with it are raised from the bed and optionally moved sideways relative thereto, to enable the vulcanized tires to be unloaded and a new tire ready for vulcanization to be introduced into each lower holder.

PRIOR ART

U.S. Pat. Nos. 3,936,251 and 4,105,379 patents (the disclosures of which are hereby incorporated by reference) disclose a particular type of press comprising a bed containing a lower holder, a handling arm mounted in cantilevered fashion on an upright guide column disposed alongside the lower holder, so as to carry out a vertical movement along the column itself and a rotation about the axis thereof and a cover, integral with the upper counter-mold, fastened under the arm, the cover being therefore movable from an opening condition in which the upper counter-mold is raised from said lower holder and optionally also rotated sideways relative to the latter, to a closing condition in which the upper counter-mold operatively matches the lower holder.

Associated with the handling arm in said U.S. patents is a grasping member that, acting through an opening formed in the middle of the cover and the upper counter-mold, lends itself to carry out engagement with the tires being worked. Therefore in this press, due to the presence of the grasping member, it is possible to pick up a finished tire from the lower holder and put it down onto a reception device located alongside the bed. Consequently the arm and the related handling mechanism in the press are practically inactive during most of the vulcanization cycle, that is, about 90% of the time according to an estimate disclosed in the patent.

Known presses, both those provided with a movable crosspiece and those having a rotating arm, built in accordance with the above teachings, at the present state of the art still have some production problems. Actually, these presses can carry out a single vulcanization cycle at a time and therefore while the vulcanization process is being carried out they are practically inactive; in particular the press provided with a rotating arm keeps the handling arm, that is one of the most expensive operating systems, stationary and therefore idle on the mold cover, while the cover is kept closed by other means.

SUMMARY OF THE INVENTION

The main object of the present invention is substantially to solve the problems of the known art by providing a press of the above discussed type in which the handling arm of which can be used several times during a vulcanization cycle, that is an arm capable of leaving the cover when closed on the respective lower holder in order to be brought to act on one or more other molds, designed to carry out the vulcanization of other tires.

A further object of the invention is to greatly reduce the heat losses through the cover during the vulcanization step.

The foregoing and further objects that will become more apparent in the course of the present description are substantially attained by a vulcanization press of the above discussed type, characterized in that it comprises at least a second mold provided with a lower holder and an upper counter-mold. The lower holder is operatively housed in the bed, alongside the guide column and moved apart by an angle relative to said first lower holder. At least a second cover engages said second upper counter-mold and also engages detachment-engagement means, associated with the handling arm so as to engage the arm with said first cover and second cover in a removable manner, individually and selectively.

BRIEF DESCRIPTION OF THE DRAWINGS

Further features and advantages will become more apparent from the detailed description of a preferred embodiment of a vulcanization press, in particular for vehicle tires, in accordance with the present invention, given hereinafter by way of non-limiting example with reference to the accompanying drawings, in which.

DESCRIPTION OF A PREFERRED EMBODIMENT

Figure 1:
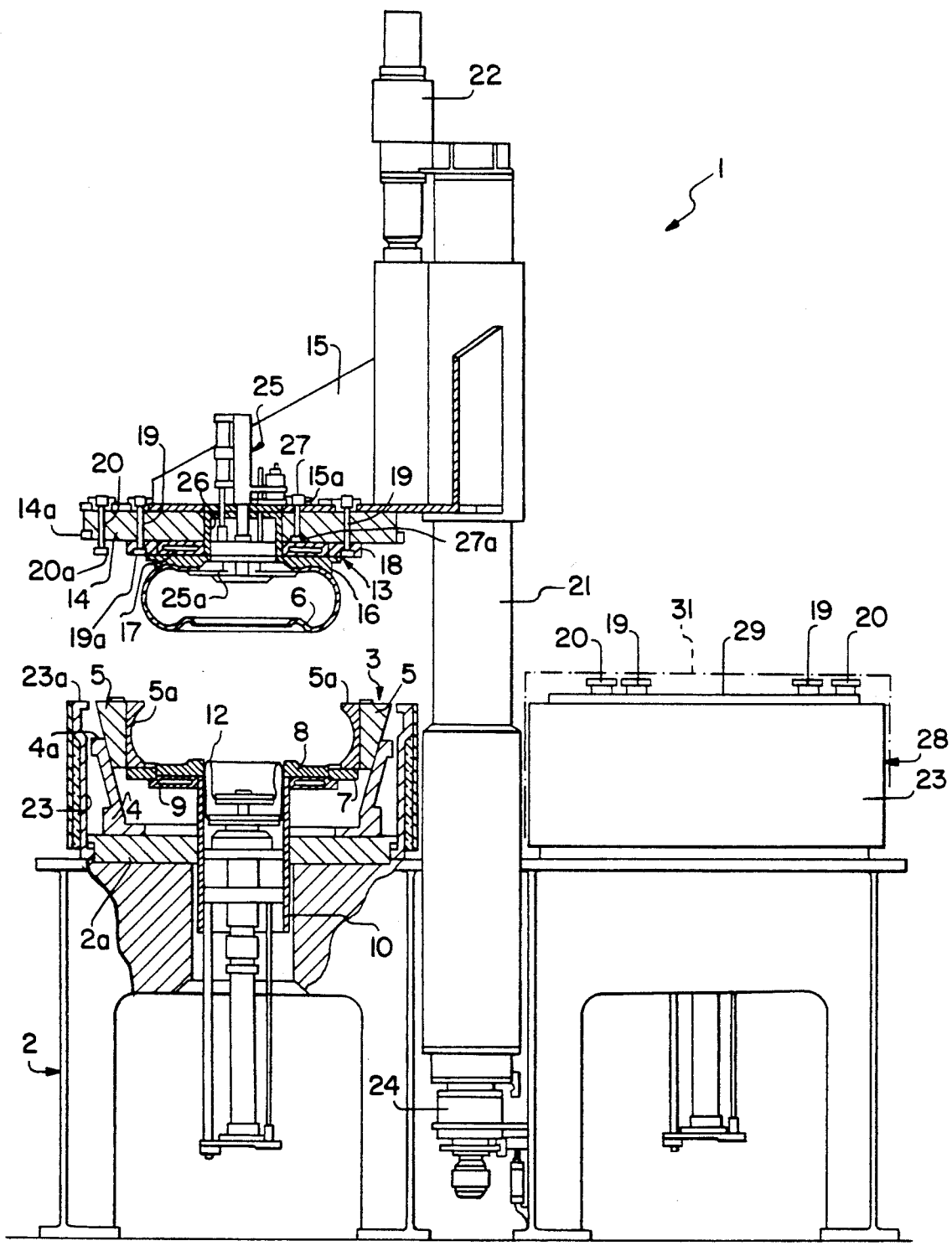
FIG. 1 is a partly sectional elevation view of the press in the open position while one of the tires is being withdrawn from the respective lower holder.

Referring to the drawings, a vulcanization press in particular for vehicle tires has been generally identified by reference numeral 1. In accordance with the present invention the press is provided with at least two molds, each of them substantially consisting of a lower holder mounted on a common bed and an upper counter-mold disposed on the lower holder. A handling arm extends in cantilevered fashion from a guide column standing up upright from the bed and disposed between the molds so that it is located symmetrically at the side of the lower holders. In other words, the distance between the center of the first mold and the column is the same as the distance between the center of the second mold an the column.

In the embodiment shown the molds, known and conventional and therefore only diagrammatically shown, are of the so-called "centripetal" type; in particular, referring to FIG. 1, the lower holder 3 is comprised of a sector-carrying ring 4 disposed on a base plate 2a carried on top of the bed 2. The sector-carrying ring 4 defines a housing of truncated conical form at the inside thereof, on which a plurality of sectors 5 is slidably guided in an axial direction, which sectors 5 carry respective dies 5a designed to act on the tread of a tire being worked. Sectors 5 slidably rest on a lower cheek-carrying ring 7 to which a lower cheek 8 designed to act on one of the tire sidewalls is fastened. The lower cheek 8 and the cheek-carrying ring 7 in turn rest on a lower heating plate 9 of annular configuration, inside which a heating fluid, generally steam flows, which steam also flows in known manner through the remaining parts of the mold.

Still in known manner, the lower heating plate 9 is fastened to the top of a lifting sleeve 10 slidably guided through the base plate 2a and submitted to the action of a hydraulic actuator, not shown, or similar means causing the lifting of the heating plate from the base plate 2a. The raising of the heating plate 9 brings about the raising of the lower cheek 8, the cheek-carrying ring 7 and sectors 5. Said sectors, sliding on the inner sides of the sector-carrying ring 4, become radially spread apart relative to the mold axis thereby reaching the open condition.

A vulcanization bladder 12 of elastomeric material is conventionally provided within the lower holder 3, which bladder, when the holder is open, is housed within the lifting sleeve 10 in a folded away condition. In a manner well known to those skilled in the art, during the vulcanization process (FIG. 2) the bladder 12 is extended and inflated by steam under pressure at the inside of the tire 6.

Also associated with the lower holder 3 is a first upper counter-mold 13 which is fastened, preferably in a removable manner as explained in the following, to the lower part of a first cover 14, in turn engaged in a removable manner under a supporting plate 15a being part of the handling arm 15. The upper counter-mold 13 comprises an upper cheek 16 receiving heat from an upper heating plate 17 similar to the lower heating plate 9 and fastened to the lower part of the cover 14.

The upper cheek 16 is arranged to act on the tire sidewall opposite that on which the lower cheek 8 acts and is fixedly linked to an upper cheek-carrying ring 18 at which the fastening of the upper counter-mold 13 assembly to the cover 14 is carried out.

Figure 2:
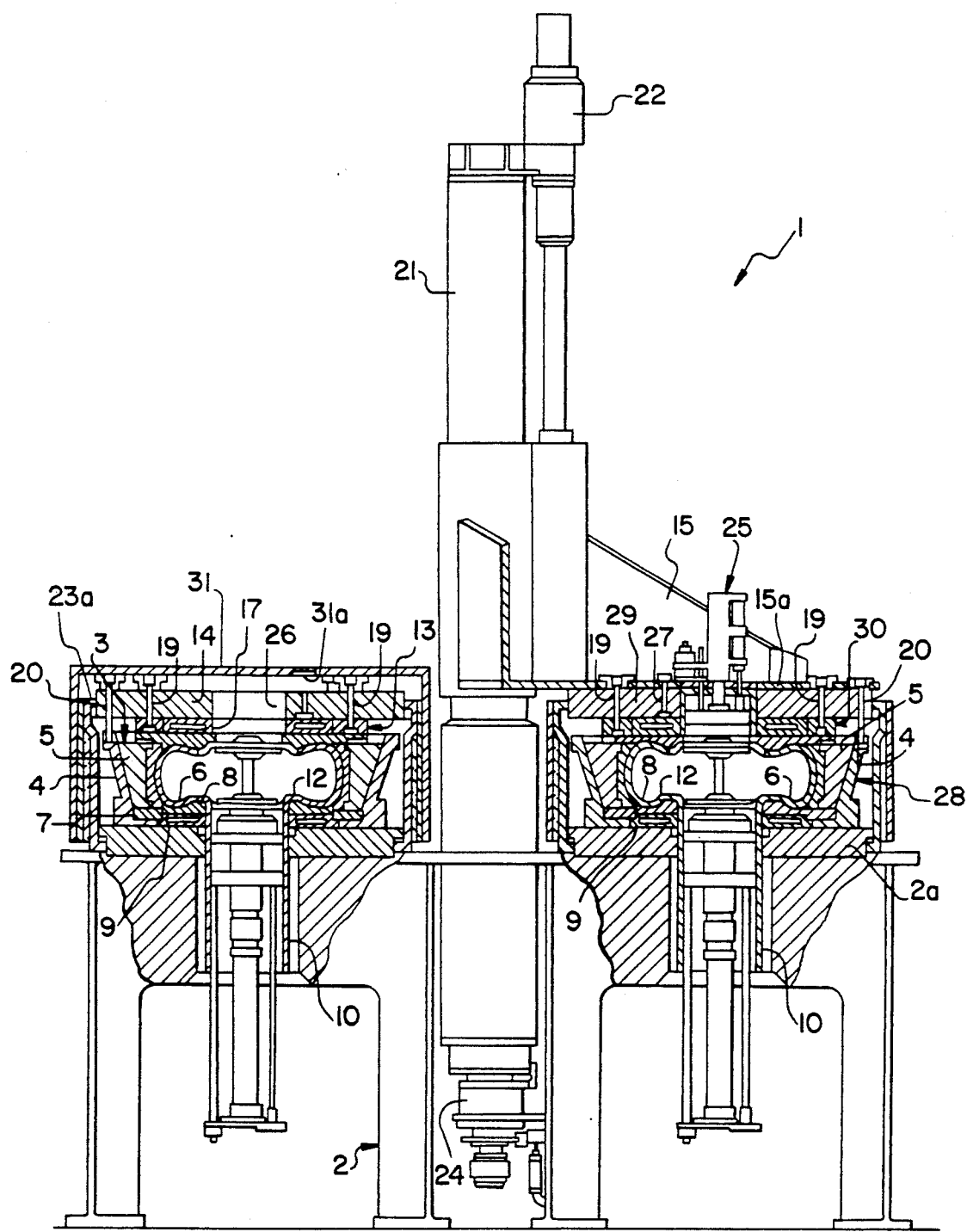
FIG. 2 is a partly sectional view taken along line II—II in FIG. 3 showing the press during the simultaneous vulcanization of two tires.

The handling arm 15 is movable, upon command of a lifting actuator 22, along the guide column 21 to vertically move the cover 14, as well as the parts connected thereto, from an opening condition in which, as shown in FIG. 1, the upper counter-mold is raised from the lower holder 3, to a closure condition in which, as shown in FIG. 2, the upper counter-mold 13 is operatively coupled with the lower holder. In the closed condition the cover is conventionally anchored to the bed 2 by known means ensuring the mold closure during the vulcanization process, against the pressure of the fluid acting inside the mold, independently of the arm 15 action.

Conventionally said means can be as described in commonly assigned U.S. Pat. No. 3,922,122 (the disclosure of which is hereby incorporated by reference), substantially consisting of a cylindrical drum 23 integral with the bed 2 containing the lower holder 3, provided along its upper edge with a toothing 23a interacting, through an angular rotation of the drum or the toothing driven by known actuator means, with a number of meshing teeth 14a radially projecting from the circumferential edge of the cover 14.

As already stated, the handling arm 15 also rotates about the axis of the guide column 21.

More particularly, in the embodiment shown, the whole column 21 is rotatable about its own axis, upon the action of a rotary actuator 24 acting at the base thereof. Following this rotatory movement, the arm 15 is moved to the side or, stated in another way, in an arcuate path to apart from the lower holder 3 and can therefore be used to pick up and/or put down tires 6 that are being processed. Alternatively, a single actuator could be used for both vertical and rotary movement.

The engagement of tires 6 to the arm 15 can take place, in a known and conventional manner, by a grasping member 25 fastened to the arm and acting through an opening 26 formed in the middle of the cover 14, the upper heating plate 17 and the upper cheek 16.

In accordance with the invention, the cover 14 is fastened to the handling arm 15 by readily removable-engagement means known per se and conventionally consisting for example of a series of latches 27 mounted on the plate 15a, rotatably engaged through the plate itself with said cover, and operated by respective actuators, which are not shown but are known per se. Each of said latches 27 has a head 27a of substantially elliptical configuration at the lower end thereof; said head is disposed according to a predetermined orientation and is adapted to freely slide through an opening matching the shape of the head and formed in the cover 14. When the respective heads 27a are properly fitted in the respective cover openings, the latches 27 are angularly rotated so that the heads come in contact with the lower end of the cover and fixedly anchor it to the plate 15a integral with the arm 15.

The above actuators are also adapted to bring the latches back to the original position to enable the heads 27a to slip off the cover 14, thereby causing the disengagement of the latter from the arm 15.

By virtue of the possibility given to the handling arm 15 of being disengaged from the first cover 14, said arm can be used to pick up other tires 6 from, or put them down into other lower holders on the bed 2, while the vulcanization of a tire 6 inside the first lower holder 3 is taking place.

The second lower holder 28 (FIG. 2) is identical in structure to the first lower holder 3. For the above reason the different parts forming the lower holder 28 and those associated therewith have been allocated the same reference numerals as the first lower holder 3 and are not further described. Associated with the second lower holder 28 is a second cover 29 detachably engaging a second upper counter-mold 30. The second cover 29 and the second counter-mold 30 are substantially identical to the first cover 14 and the first counter-mold 13 and a detailed description of the same is therefore not necessary. The different components of the second cover 29 have been allocated the same reference numerals previously adopted for the first cover 14 and counter-mold 13.

In accordance with a further feature of the invention also a cup-shaped isolating element 31 may be provided to be detachably engaged by removable-engagement means associated with the arm 15 so as to be alternately positioned on the first cover 14 and the second cover 29 when each cover is in its closing condition on the respective lower holder 3, 28 during the vulcanization step and must be disengaged from the arm 15 during the tire vulcanization. In particular the cup-shaped isolating element 31 is provided with respective engagement openings 31a designed to be operatively engaged by the latch heads 27a in order to achieve the connection between the cup-shaped element and the handling arm 15. The adoption of this isolating cup-shaped element 31 greatly reduces losses of heat through the opening 26 of covers 14 or 30 during the vulcanization step.

On the other hand it will be recognized that said loss of heat can also be eliminated by using other alternative means, in place of the cup-shaped element herein described for the purpose of completing the description.

For example, each cover could be provided with its own grasping member 25: in this case obviously the plate 15a should have an appropriate hole in register with said grasping member in order to enable the arm 15 to be moved from one holder to another after disengagement of the plate 15 from the member 25 by a vertical displacement of the arm along the guide column.

Alternatively, obturator means can be provided on the cover 14, for example of the diaphragm type, adapted to plug the hole left open by the grasping member integral with the arm 15 moving onto the adjacent mold.

Operation of the vulcanization press described above mainly as regards structure, is as follows.

Shown in FIG. 2 is the operating step in which the handling arm 15 is engaged, upon the action of latches 27, on the second cover 29 disposed in a closed condition on the second holder 28, where the vulcanization of a tire 6 has started.

Still referring to the operating step shown in FIG. 2, the first cover 14 is disposed in a closed condition on the first holder 3, in which the vulcanization of another tire 6 has begun before the closure of the second holder 28. Disposed on the first cover 14 is the isolating cup-shaped element 31 that has been positioned thereon by the handling arm 15 before its engagement with the second cover 28. When the vulcanization of the tire 6 disposed in the first holder 3 is about to finish, latches 27 are operated by the respective actuators so as to disengage the cover 29 from the handling arm 15 which is raised by the actuator 22 leaving the cover in a closed condition on the second mold 28. By an angular rotation controlled by the rotary actuator 24, the handling arm 15 is brought over the isolating cup-shaped element 31 and afterwards is lowered thereon so as to engage it upon the action of latches 27. At this time the handling arm 15 is lifted up again and moved, in order to put down the isolating cup-shaped element alongside the first mold or, preferably, onto the second cover 29. Once the disengagement of the isolating cup-shaped element has taken place, the handling arm 15 is brought back over the first cover 14 and engaged thereto, still upon the action of latches 27.

Meanwhile, the vulcanization bladder 12, previously held in an operating condition, is deflated and folded away within the lifting sleeve 10, in a rest condition. The first cover 14 is disengaged from the bed 2 and is then raised (FIG. 1) from the first holder 3 which simultaneously assumes the opening condition as a result of the raising of the lower heating plate 9 upon the action of the corresponding actuator acting on the lifting sleeve 10. Meanwhile, the grasping member 25 has been activated and it engages the vulcanized tire 6. Consequently, the tire 6 is withdrawn from the lower holder 3 by effect of the lifting of cover 14 by the handling arm 15.

Figure 3:
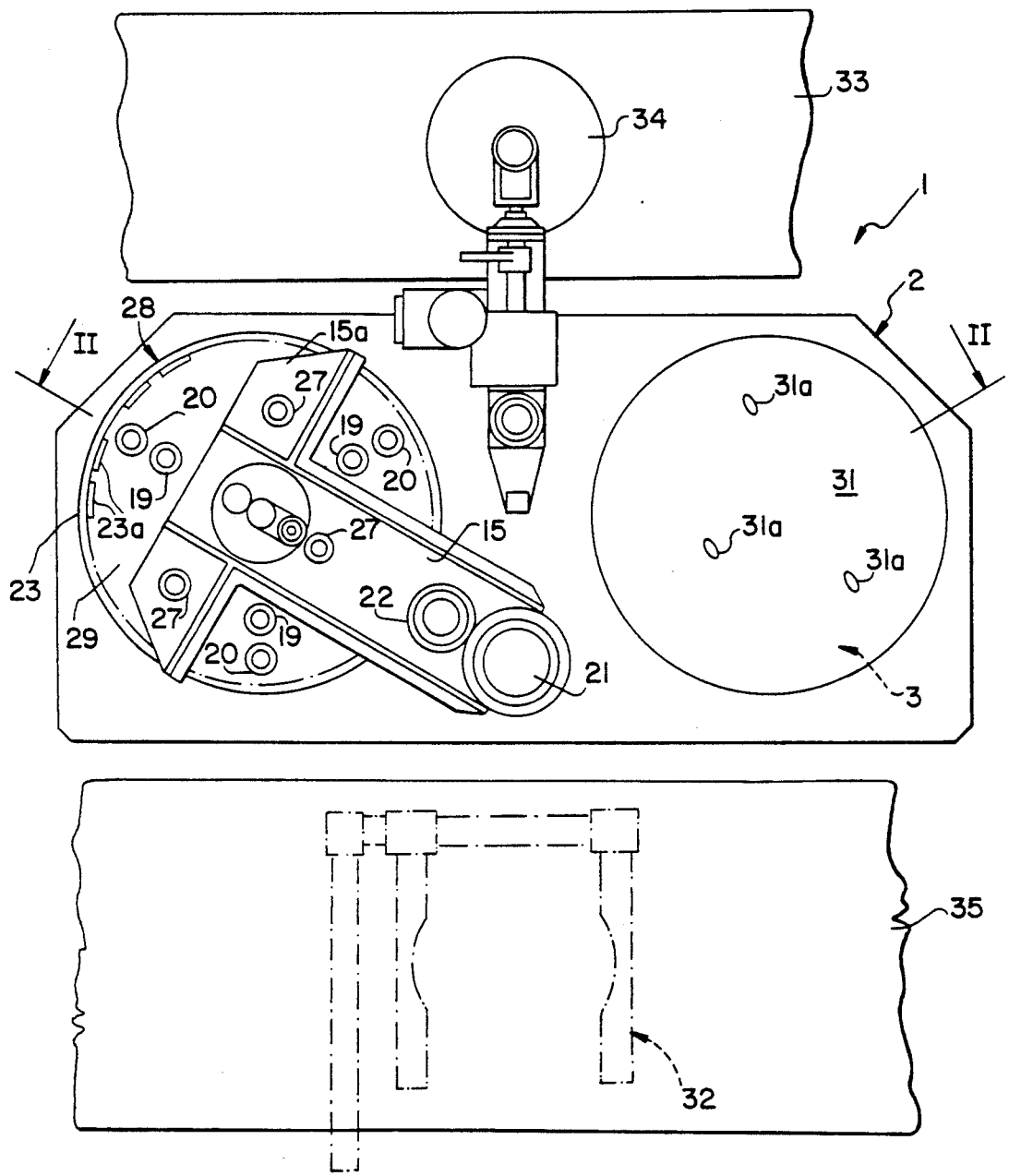
FIG. 3 is a diagrammatic top view of the press in the operating conditions of FIG. 1.

At this point the handling arm 15 is rotated upon command of the rotatory actuator 24 to drop the vulcanized tire 6 onto a conventional reception device 32 acting close to the bed 2 (FIG. 3). The first lower holder 3 in the open condition is now ready to receive a new tire 6 to be vulcanized, arranged on a conventional feed line 33 extending adjacent the bed 2. The withdrawal of the new tire 6 from the feed line 33 can be for example carried out directly upon the action of the arm 15 through the grasping member 25, or, as in the embodiment shown in FIG. 3, upon the action of an auxiliary grasping member 34 associated with the bed 2 and interlocked to both of the lower holders 3, 28. When a new tire 6 to be vulcanized has been introduced into the first lower holder 3, the first cover 14 is brought back again to the closed condition on the lower holder and, when the bladder 12 is disposed in the operating condition within the closed holder, a new vulcanization cycle begins. The handling arm 15 keeps its engagement with the first cover 14 so as to avoid heat escaping from said opening 26, since the vulcanization of the tire enclosed in the second mold is about to be completed.

When this situation occurs, latches 27 will disengage the first cover 14 from the handling arm 15 and the air will move over the isolating cup-shaped element 31 so as to engage it and transfer it again over to the first cover 14. The isolating cup-shaped element 31 is then laid down onto the first cover 14 and afterwards the handling arm 15 will engage the second cover 29 thereby carrying out the subsequent operations involving the opening of the second holder 28, unloading of the vulcanized tire 6 and operation of a new closure of holder 28, after introduction of a new tire to be vulcanized thereinto.

The inventive press can be further improved if the handling arm 15 is also used to carry out the replacement of one or both molds.

For the purpose the molds can be fastened to the press by means of known automatic locking devices such as those described in commonly assigned U.S. Pat.

No. 4,580,959 (the disclosure of which is hereby incorporated by reference) in accordance with a convenient embodiment these devices are comprised of a first series of latches 19 circumferentially distributed on the cover 14, operated by respective actuators, not shown, mounted on the plate 15a and rotatably engaged with said cover through the ring 18, and a second series of latches 20, associated with the cover 14 as well, which, in the same manner as previously stated, are operated by respective actuators, not shown, also mounted on the plate 15a of the handling arm 15, rotatably engaged with the cover 14 through a corresponding housing formed in the upper edge 4a of the sector-carrying ring 4. Finally, the lower holders 3, 28 must be also engaged to the bed by corresponding locking devices known per se, similar to said latches 10 and 20 for example, and therefore not shown.

The process for replacing the molds is known for example from said U.S. Patent in the name of the same assignee and therefore a detailed description thereof appears unnecessary, also taking into account the fact that it can be easily understood from the above description of the press. In any case, after the mold has been disengaged from the bed and secured to the handling arm 15, the arm is raised for moving the mold away from the bed 2 and transferring it above a mold-replacing facility (FIG. 3) located adjacent the bed 2. The mold is laid down on the mold-replacing facility 35 by disengagement of the first latches 19 and second latches 20 from the corresponding housings on the mold; afterwards it will be possible, through said latches, to carry out the engagement of a new mold to be fastened to the bed 2 in order to carry out the vulcanization of tires having different features from those previously worked.

In the embodiment shown, the first latches 19 and second latches 20 are mounted on respective covers 14 and 29 and are engaged to said covers when the selfsame covers are released from the handling arm 15, thereby being disengaged from the respective actuators too which on the contrary are always conveniently mounted on the supporting plate 15a of the handling arm 15. However said latches 10 and 20 could be also fastened to said plate 15a, being thereby permanently connected to the respective actuators: obviously in this case said latches will leave the mold cover together with the handling arm, on each disengagement operation of said arm from cover 14, 29.

It will be also recognized that the handling arm 15 must not necessarily be linked to a single cover at a time, as shown by way of example in the preceding description, but could simultaneously govern more covers, which will bring about the possibility of serving a greater number of molds, a multiple of the number of molds that are simultaneously acted upon by said arm.

Since the handling arm can be released from the mold covers, the press of this invention is capable of being interlocked to other molds while the vulcanization process is taking place in one of them. This results in an important increase in the productivity as compared with that achieved with known vulcanization presses. It is in fact to be noted that the presence of two or more molds operable separately from each other allows not only the working of two or more identical tires to be carried out simultaneously but, should the necessity arise, also the working of different types of tires, that is tires needing different vulcanization times with respect to each other; this operating condition obviously will be possible only if when the press is in use it will never become necessary to act on both molds simultaneously.

It is of course understood that modifications and variations can be made to the invention as conceived, all of them falling within the scope of the inventive idea.

I claim:

1. A vulcanization press for vehicle tires comprising:
   at least one bed and at least two molds,
   each mold comprising a lower holding mold and an upper counter-mold;
   said lower holding mold being operatively positioned on said bed;
   a generally vertical guide column positioned adjacent said molds and upstanding from the bed;
   a handling arm mounted to project outwardly from the guide column and means for (a) mounting the handling arm for vertical movement along the column and (b) for rotational movement of the handling arm about said guide column;
   detachment and engagement means on said handling arm for detachably engaging at least one of a mold cover and said upper counter mold;
   said mold cover being of a shape and size to fit over said upper counter mold;
   said detachment-engagement means comprising a series of rotatably operable latches secured to the handling arm and each carrying, at a lower part thereof, a substantially elliptical head arranged to be fitted into a series of opening matching the shape of said head and formed in said cover and said upper counter-mold and means to rotate said latches so as to come in contact with the lower surface of the cover or upper counter-mold in order to secure it to the handling arm;
   said at least two molds being positioned in relation to said guide column so that the handling arm can engage said cover or one of said upper counter molds on one mold and move the cover or the upper counter mold upwardly and arcuately sideways and vertically downwardly to be positioned upon the lower holding mold of said other mold.

2. A vulcanization press according to claim 1, in which in each mold said cover and said upper counter-mold have means for fastening to each other by first automatic-locking devices, so as to engage said cover to said upper counter-mold in a removable manner.

3. A vulcanization press according to claim 1, in which in each mold said cover and lower holder have means for fastening so that they can be connected to each other by second automatic-locking devices so as to engage said cover to said lower holder in a removable manner.

4. A vulcanization press according to claim 2, in which said first and second automatic-locking devices are fastened to said handling arm.

5. A vulcanization press according to claim 3, in which said first and second automatic-locking devices are fastened to said handling arm.

6. A vulcanization press according to claim 1, including means for reducing the loss of heat from said molds in a closed condition.

7. A vulcanization press according to claim 6, in which said means for reducing the loss of heat comprises an isolating cup-shaped member positioned to be removably engaged by detachment-engagement means to be selectively lowered onto said first and second covers when they are in the closed condition.

8. A vulcanization press according to claim 7, in which said detachment-engagement means are the same detachment-engagement means as act between said covers and handling arm.

9. A vulcanization press according to claim 8, in which each cover has its own grasping member.

10. A vulcanization press according to claim 1, including a grasping member associated with said handling arm for removably engaging a tire being worked, said grasping member acting through an opening through each of said covers and each of said upper molds.

* * * * *